United States Patent
Jo et al.

(10) Patent No.: US 7,417,969 B2
(45) Date of Patent: Aug. 26, 2008

(54) PATH CONTROL DEVICE AND PATH CONTROL METHOD

(75) Inventors: Manhee Jo, Yokohama (JP); Shinichi Isobe, Yokosuka (JP); Katsutoshi Nishida, Yokohama (JP); Takatoshi Okagawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 755 days.

(21) Appl. No.: 10/757,404

(22) Filed: Jan. 15, 2004

(65) Prior Publication Data

US 2004/0146046 A1 Jul. 29, 2004

(30) Foreign Application Priority Data

Jan. 16, 2003 (JP) .............................. 2003-008587

(51) Int. Cl.
*H04Q 7/00* (2006.01)
(52) U.S. Cl. ..................... 370/331; 370/338; 455/436
(58) Field of Classification Search ........................ None
See application file for complete search history.

(56) References Cited

U.S. PATENT DOCUMENTS

| 6,130,881 A | 10/2000 | Stiller et al. | |
|---|---|---|---|
| 6,763,007 B1 * | 7/2004 | La Porta et al. | 370/331 |
| 7,161,929 B1 * | 1/2007 | O'Neill et al. | 370/349 |

FOREIGN PATENT DOCUMENTS

| CN | 1299541 A | 6/2001 |
|---|---|---|
| JP | 11-340992 | 12/1999 |
| JP | 2000-78165 | 3/2000 |
| JP | 3046812 | 3/2000 |

OTHER PUBLICATIONS

Chai-Keong Toh, "Performance Evaluation of Crossover Switch Discovery Algorithms for Wireless ATM LANs", IEEE Infocom, vol. 3, 1996, pp. 1380-1387.

Andrew T. Campbell, et al., "Comparison of IP Micromobility Protocols", IEEE Wireless Communications, vol. 9, No. 1, XP-011093843, Feb. 2002, pp. 72-82.

(Continued)

*Primary Examiner*—Edan Orgad
*Assistant Examiner*—Jung Park
(74) *Attorney, Agent, or Firm*—Oblon, Spivak, McClelland, Maier & Neustadt, P.C.

(57) ABSTRACT

Determining a cross over router on the occasion of a migration of a mobile terminal connected to a network during communication in the network. A path control device receives path control information from each router in the network and stores the information as a path control table. Then, a pre-migration path between the mobile terminal and the correspondent terminal is recognized and, on the occasion of a migration of a mobile terminal, the path control device predicts a post-migration path between the mobile terminal and the correspondent terminal. The path control device then compares the pre-migration path and the post-migration path to derive as a common part, and a router closest to the mobile terminal in the common part is determined as a cross over router.

7 Claims, 7 Drawing Sheets

OTHER PUBLICATIONS

Ramachandran Ramjee, et al., "Hawaii: A Domain-Based Approach for Supporting Mobility in Wide-Area Wireless Networks", IEEE/ACM Transactions on Networking, vol. 10, No. 3, XP-011077170, Jun. 2002, pp. 396-410.

Gopal Dommety, et al., "A Route Optimization Algorithm and Its Application to Mobile Location Management in ATM Networks", IEEE Journal on Selected Areas in Communications, vol. 16, No. 6, XP-011054805, Aug. 1998, pp. 890-908.

Jari T. Malinen, et al., "Mobile IPv6 Regional Registrations draft-malinen-mobileip-regreg6-01.txt", IETF Standard-Working-Draft, No. 1, XP-015031979, Mar. 2, 2001, pp. 1-28.

Shin-ichi. Isobe, et al., The Institute of Electronics, Information and Communication Engineers, IN2002-112, pp. 55-60, "Cross Over Router (CoR) Buffering Handover", Nov. 2002, (with English Abstract).

* cited by examiner

*Fig.5*

| DESTINATION / SOURCE | N1 | N2 | N3 | N4 | N5 | N6 |
|---|---|---|---|---|---|---|
| N1 | — | R2 | R2 | R2 | R2 | R2 |
| N2 | R1 | — | R3 | R5 | R5 | R6 |
| N3 | R2 | R2 | — | R5 | R5 | R2 |
| N4 | R5 | R5 | R5 | — | R5 | R5 |
| N5 | R2 | R2 | R3 | R4 |  | R6 |
| N6 | R2 | R2 | R2 | R5 | R5 | — |

Fig.6A

| DESTINATION | NEIGHBORING ROUTER |
|---|---|
| N1 | R2 |
| N2 | R2 |
| N4 | R5 |
| N5 | R5 |
| N6 | R2 |

Fig.6B

| DESTINATION | NEIGHBORING ROUTER |
|---|---|
| N1 | R1 |
| N3 | R3 |
| N4 | R5 |
| N5 | R5 |
| N6 | R6 |

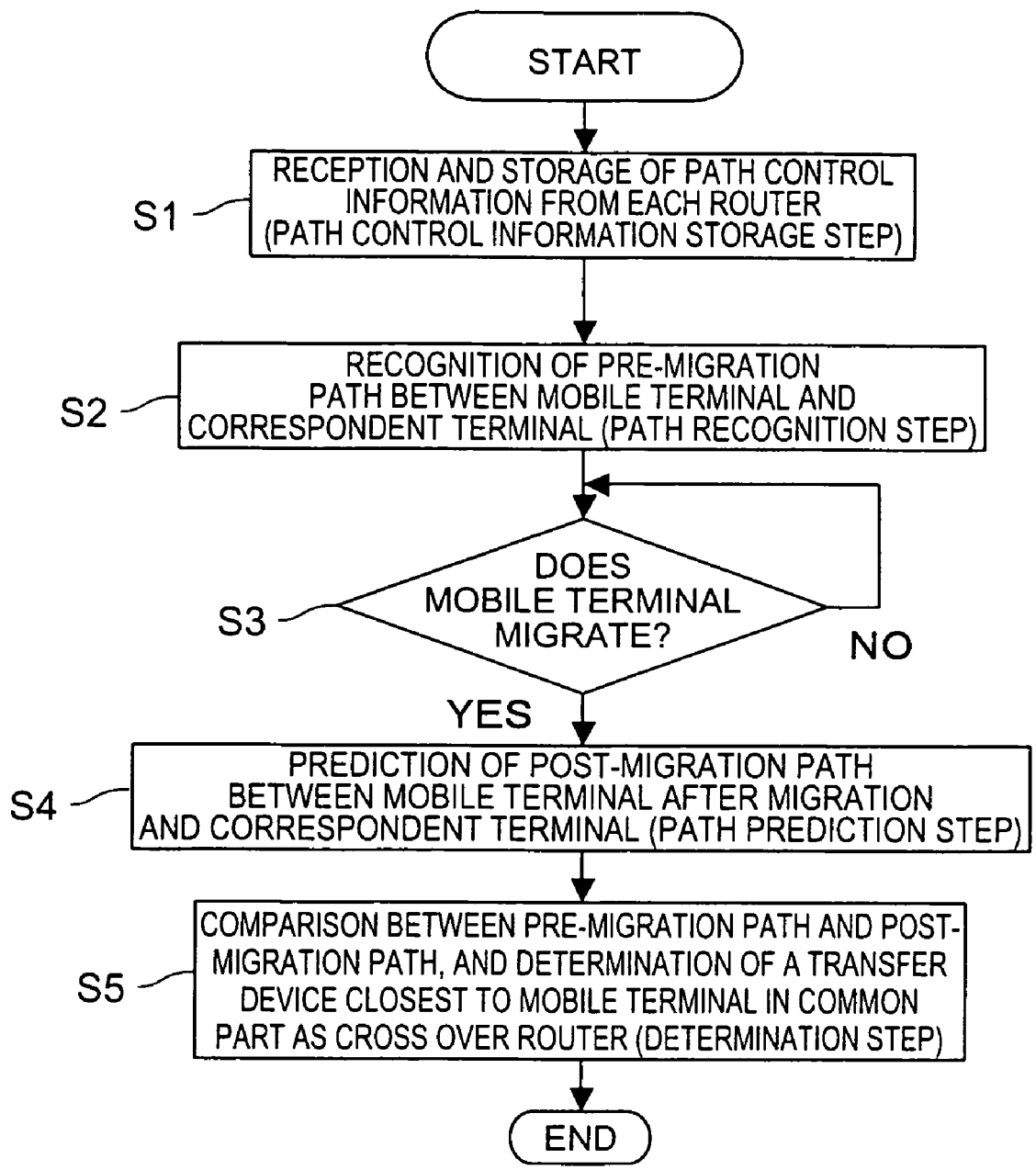

Fig.8

| PRE-MIGRATION PATH | CORRESPONDENT TERMINAL #C → R3 → R2 → R1 → MOBILE TERMINAL #M |
|---|---|
| PREDICTED POST-MIGRATION PATH | CORRESPONDENT TERMINAL #C → R3 → R2 → R6 → MOBILE TERMINAL #M |

PATH CONTROL DEVICE AND PATH CONTROL METHOD

BACKGROUND OF THE INVENTION

1. Field of the Invention

This invention relates to a path control device, being connected to a plurality of transfer devices for transferring a packet on a network so as to control a transfer path of the packet, and a path control method executed in the path control device.

2. Related Background Art

In a conventional mobile communication network, the network is generally constructed in such a network topology as shown in FIG. 1A, mainly containing a tree structure that the path is fixedly determined, it has been easy to determine a cross over router R2, serving as a switchover point of the path, in association with the migration of a terminal (refer to "Hand over control by buffering in a cross over router", Isobe, Iwasaki, Igarashi, Ihara, Yabusaki; Technical Report of IEICE IN2002-112, November 2002).

SUMMARY OF THE INVENTION

However, in a packet transfer network such as the Internet, which is not always constructed in a network topology, containing a tree structure as shown in FIG. 1B, not only one but a plurality of paths of packets can be established. That is, a plurality of paths such as a path AR1-R2-AR3 and a path AR1-R3-AR3 could be established. Therefore, the topology of the network does not allow determination of the unique path after migration of a terminal, thus making it impossible to uniquely determine the cross over router serving as the switchover point of the path.

The present invention has been made to solve the above-described problem. An object of the invention is to provide a path control device and a path control method whereby, in a packet transfer network in which the transfer part and the control part are separated from each other, a cross over router as a switchover point of the path can be determined, when a mobile terminal connected to a network via radio migrates during a communication.

In order to achieve the above object, a path control device is provided according to the present invention, wherein the path control device is connected to a plurality of transfer devices for transferring a packet on a network, so as to control a transfer path of the packet, the path control device comprising: a path control information storage means for holding a plurality of pieces of path control information kept in a stored state, the plurality of pieces of path control information being transferred from the plurality of transfer devices, and a path control means for recognizing a path between a mobile terminal and the correspondent terminal, based on a location information of each of the mobile terminal and the correspondent terminal as a correspondent node mentioned above as well as the plurality of pieces of path control information, so as to determine a transfer device that serves as a switchover point of the path, on the occasion of a change of the path accompanied by an occasional migration of the mobile terminal.

Also, according to the invention, a path control method is provided to be applied to a path control device connected to a plurality of transfer devices for transferring a packet on a network so as to control a transfer path of the packet, the path control method comprising the steps of: a path control information storage step wherein a plurality of pieces of path control information transferred from the plurality of transfer devices are received and stored; a path recognition step wherein a pre-migration path between a mobile terminal and the correspondent terminal is recognized, based on a location information of each of the mobile terminal and the correspondent terminal as a correspondent node as well as the plurality of pieces of path control information; a path prediction step wherein, when the mobile terminal migrates, a post-migration path between the mobile terminal after the migration and the correspondent terminal is predicted, based on the location information of the mobile terminal after the migration, the location information of each of the correspondent terminal as well as the plurality of pieces of path control information; and a determination step wherein a transfer device serving as a switchover point of the path is determined based on the pre-migration path and the post-migration path.

As described above, the invention is applied to a packet transfer network comprised of a plurality of transfer devices (i.e., so-called transfer part) for transferring a packet on a network and a path control device (i.e., so-called control part) connected to these plurality of transfer devices so as to control the transfer path of the packet, wherein the transfer devices and the path control device are separated from each other. In the path control device pertaining to the above-described network, a plurality of pieces of path control information transferred from the plurality of transfer devices are kept in a stored state in the path control information storage means. That is, the path control information is shared by the transfer part and the control part. In this invention, the path control device doesn't have to be connected directly to each of the plurality of transfer devices, but may be indirectly connected thereto via a relay or the like.

Here, by means of the path control means, the path control device recognizes the path between the mobile terminal and the correspondent terminal, based on the location information of each of the mobile terminal and the correspondent terminal as a correspondent node as well as a plurality of pieces of path control information, whereupon on the occasion of a change of the path accompanied by the migration of the mobile terminal, a transfer device serving as a switchover point of the path is determined. To be more specific the path control device recognizes a pre-migration path between the mobile terminal and the correspondent terminal, based on the location information of each of the mobile terminal and the correspondent terminal as a correspondent node as well as the plurality of pieces of path control information (path recognition step), whereupon, on the occasion of the migration of the mobile terminal, the path control device predicts a post-migration path between the mobile terminal after migration and the correspondent terminal, based on the location information of the mobile terminal after migration, the location information of the correspondent terminal as well as the plurality of pieces of path control information (path prediction step). And based on the pre-migration pa'th and the post-migration path, the transfer device serving as the switchover point of the path is determined (determination step).

As described above, in a packet transfer network in which the transfer part and the control part are separated from each other, a cross over router that serves as the switchover point of the path can be determined, when a mobile terminal connected to the network via radio migrates during a communication.

According to the path control device and the path control method of the present invention, the following modes can be adopted.

In the above determination step, it is a distinctive feature that the pre-migration path and the post-migration path are compared with each other, such that the transfer device serving as the switchover point is to be determined. That is, by making a comparison between the pre-migration path and the post-migration path, a common part and a different part between both paths thereof can be recognized, so that, it is made possible to determine a transfer device corresponding to a point of switching over from the common part to a different part, as the transfer device serving as the switchover point. As well, in the path control device according to the present invention, it is a distinctive characteristic feature that the path control means predicts a post-migration path from the correspondent terminal to a transfer device to which the mobile terminal will probably be connected after migration of the mobile terminal, and then makes a comparison between a pre-migration path from the correspondent terminal to a transfer device to which the mobile terminal has been kept connected before migration and the predicted post-migration path, whereby a transfer device serving as the switchover point is determined.

Further, in the determination step, it is a distinctive characteristic feature that a transfer device being closest to the mobile terminal in a common part between the pre-migration path and the post-migration path, is determined as the transfer device serving as the switchover point. Comparing the pre-migration path and the post-migration path, parts of both paths near to the mobile terminal side are different (called different part in this invention) rather than those near to the correspondent terminal side (called common part in this invention), since the mobile terminal migrates rather than the correspondent terminal. Accordingly, a transfer device closest to the mobile terminal in a common part between the pre-migration path and the post-migration path, corresponds to the transfer device that serves as a point of the switching over from the common part to a different part. Therefore, a transfer device closest to the mobile terminal in a common part between the pre-migration path and the post-migration path, can be determined as a suitable transfer device serving as the switchover point. Such is also similarly the case with the path control device according to a further aspect of the present invention. As such likewise, in the path control device according to this aspect of the present invention, it is a distinctive characteristic feature that the path control means determines a transfer device closest to the mobile terminal in the common part between the pre-migration path and the post-migration path, as the transfer device serving as the switchover point.

BRIEF DESCRIPTION OF THE DRAWINGS

FIG. 5 shows an example of a path control table.

FIG. 6A shows an example of a routing table provided in a router R3.

FIG. 6B shows an example of a routing table provided in a router R2.

FIG. 7 shows a flowchart of the cross over router determination process executed in the path control device.

FIG. 8 shows a table for explaining a determination step of the process shown in FIG. 7.

DESCRIPTION OF THE PREFERRED EMBODIMENT

Hereinafter, a preferred embodiment according to the present invention will be described in detail with reference to the drawings.

Figure 1A:
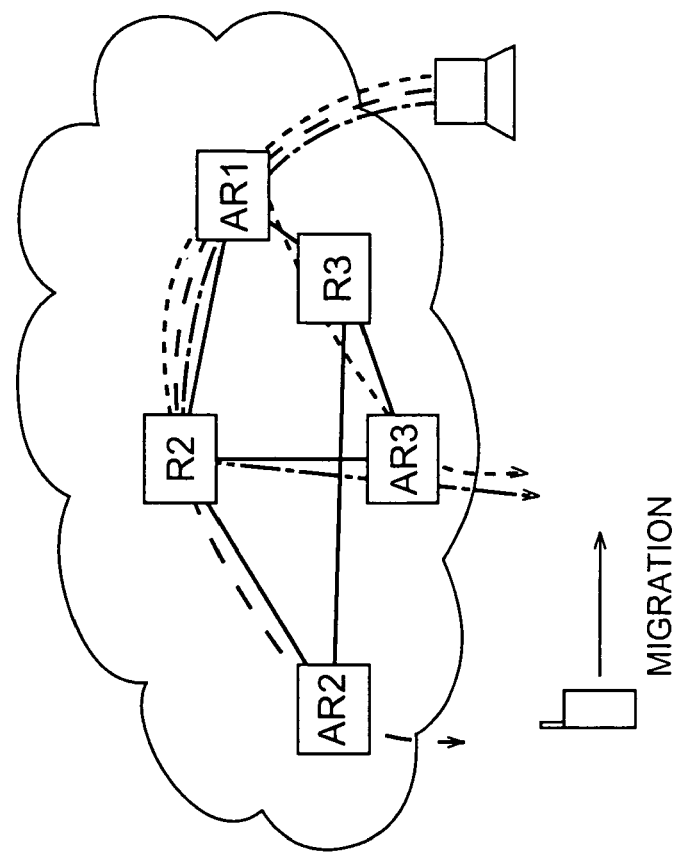
FIG. 1A is an explanatory diagram showing a cross over router determination process in a network having a conventional tree structure.
Figure 1B:
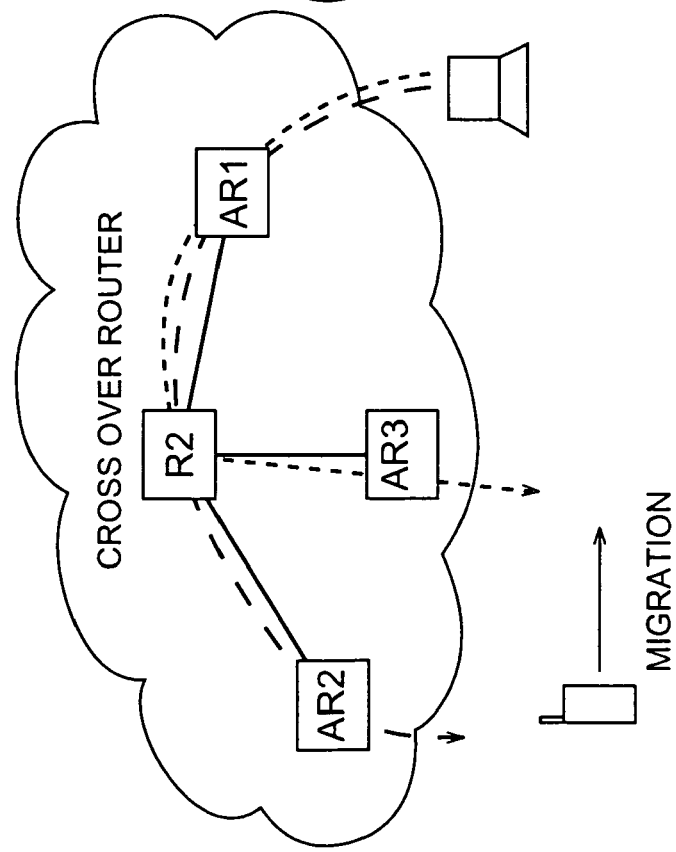
FIG. 1B is an explanatory diagram showing a cross over router determination process in a network without any network topology involving a tree structure.
Figure 2:
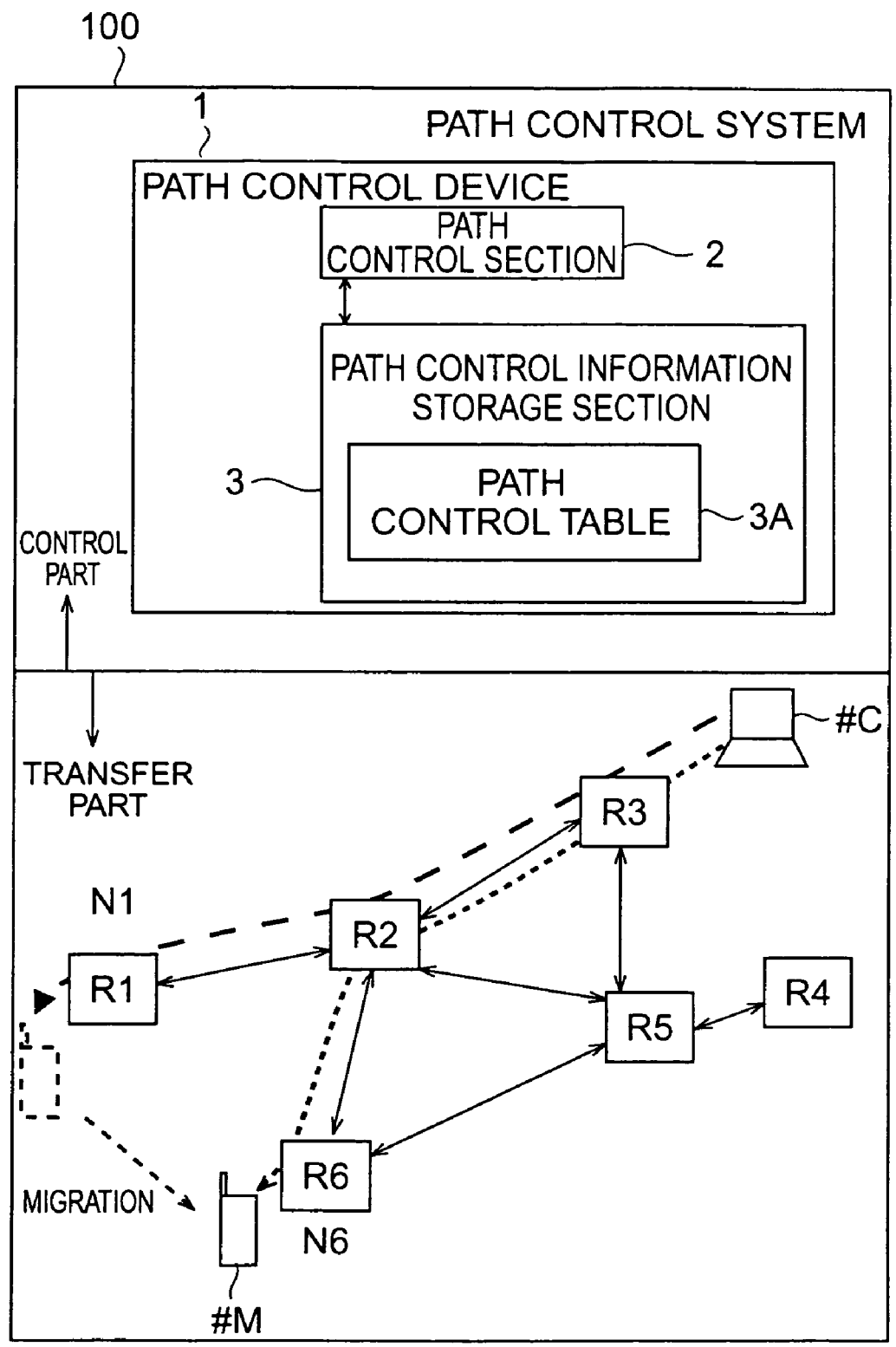
FIG. 2 is a diagram showing an overall arrangement of a path control system and a functional arrangement of a path control device.

FIG. 2 is a diagram showing an overall arrangement of a path control system 100 and a functional arrangement of a path control device 1. As shown in FIG. 2, the path control system 100 comprises the path control device 1 included in a control part and routers R1-R6 included in a transfer part.

The control part and the transfer part are definitely separated from each other. The control part corresponds to a path control device 1 and the transfer part corresponds to a plurality of routers R1-R6, both of which are physical components of the path control system 100. The path control device 1 and each of the routers are capable of transmitting and receiving data between those via wired-links. Each router is capable of transmitting and receiving data in communication with other routers via wired-links or via both wired-links and routers.

As shown in FIG. 2, the path control device 1 is provided with a path control section 2 (corresponding to path control means) and a path control information storage section 3 (corresponding to path control information storage means). The respective sections are connected to each other so as to input/output signals corresponding to the function of the respective sections through a bus. The path control information storage section 3 includes a path control table 3A, in which a path control information is stored.

Figure 3:
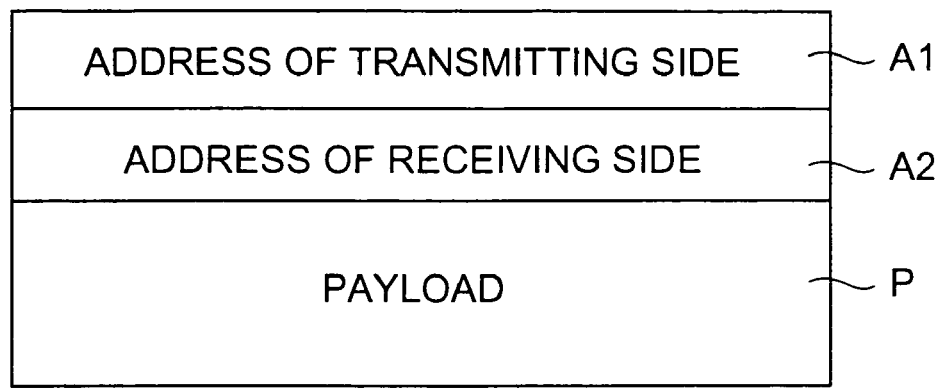
FIG. 3 is a diagram showing minimum fields that a packet transmitted through the network must have.

FIG. 3 is a diagram showing minimum fields to be included in a packet transmitted through the network. As shown in FIG. 3, the packet includes an address of a terminal at transmitting side (address of transmitting side) A1, an address of a terminal at receiving side (address of receiving side) A2 and a data payload P.

Figure 4:
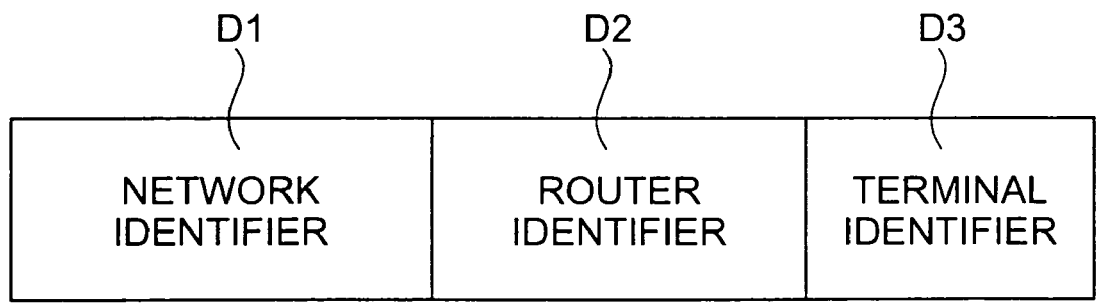
FIG. 4 is a diagram showing information contained in each of addresses A1 and A2 in a packet format shown in FIG. 3.

FIG. 4 is a diagram showing information included in each of the addresses A1 and A2 in a packet format shown in FIG. 3. As shown in FIG. 3, the address includes a network identifier D1, by which a network can be identified, and a router identifier D2 which enables the routing up to the router. A last terminal identifier D3 is a terminal identifier that is uniquely assigned to a terminal by each router. This field is used when an edge router determines to which terminal the packet should be transmitted. That is, among the intermediate routers except the edge router, the routing is carried out using only the network identifier D1 and router identifier D2.

In the transfer part shown in FIG. 2, a path before migration of a terminal and a predicted path after migration of the terminal are shown. Each of the routers R1-R6 is provided with path control information for transferring a packet to a destination, as a routing table. For example, FIG. 6A shows a routing table provided in the router R3 and FIG. 6B shows a routing table provided in the router R2. Each of N1-N6 of "destination" in these routing tables represents an identifier in the destination network and includes the information of the network identifier D1 and the router identifier D2 shown in FIG. 4. The destination address of a mobile terminal #M which is the destination of a packet, is equivalent to the address of transmitting side A1 (FIG. 3) in the packet, and varies depending on the location of the mobile terminal #M.

The path control information in the routing table shown in FIG. 6A and FIG. 6B, is transferred from each router to a path control device 1, and in the path control device 1, the path control information is stored in the path control table 3A. FIG. 5 shows an example of the path control table 3A. As shown in FIG. 5, focusing attention on the row of a source N3, the information in the columns of destinations N1, N2, N4, N5 and N6 corresponds with the information in the routing table provided in the router R3 shown in FIG. 6A. Likewise, focusing attention on the row of a source N2, the information in the columns of destinations N1, N3, N4, N5 and N6 corresponds with the information in the routing table provided in the router R2 shown in FIG. 6B. As described above, in the path control system 100, the control part and the transfer part share the path control information with each other.

As described above, the path control device 1 has the path control information equivalent to the information retained by each router in the transfer part, and based on the path control information, the path control device 1 recognizes a path through which a packet is transferred in a manner as described below. As shown in FIG. 2, before the mobile terminal #M migrates, the mobile terminal #M under the transfer control of the router R1 receives a packet from the correspondent terminal #C under the transfer control of the router R3. The packet at this time is transferred to the mobile terminal #M through a path "R3-R2-R1" indicated with a broken line in FIG. 2. This path is recognized in a manner as described below. That is, in the path control table 3A shown in FIG. 5, in case of source N3 and destination N1, since R2 is assigned, the router R2 comes next to the router R3. Further, in case of source N2 and destination N1, since R1 is assigned, the router R1 comes next to the router R2. Accordingly, a path "R3-R2-R1" is recognized.

After that, when the mobile terminal #M migrates to an area that is under the transfer control of the router R6, a new path is recognized in a manner as described below. That is, in the path control table 3A shown in FIG. 5, in case of source N3 and destination N6, since R2 is assigned, the router R2 comes next to the router R3. Further, in case of source N2 and destination N6, since R6 is assigned, the router R6 comes next to the router R2. Accordingly, a new path "R3-R2-R6" indicated with a broken line in FIG. 2 is recognized.

Hereinafter, referring to FIGS. 7 and 8, a process in which a cross over router is determined when the mobile terminal #M migrates, will be described. In the path control device 1, a sequence of process shown in FIG. 7 is carried out.

First of all, the path control device 1 receives path control information from each router, and keeps stored the information as a path control table 3A (S1 in FIG. 7: path control information storage step). Then it recognizes a pre-migration path between the mobile terminal #M and the correspondent terminal #C in the above-mentioned manner (S2: path recognition step). Thereafter when the mobile terminal #M migrates (in case of YES judgment in S3), the path control device 1 predicts a post-migration path between the mobile terminal and the correspondent terminal after the migration in a manner as described above (S4: path prediction step), and thereupon makes a comparison between the pre-migration path and the post-migration path, so as to determine a transfer device being the closest to the mobile terminal in a common part of both paths, as the cross over router (S5: determination step).

In the determination step 5, as shown in FIG. 8, a comparison between the pre-migration path "#C-R3-R2-R1-#M" from the correspondent terminal #C to the mobile terminal #M and the post-migration path "#C-R3-R2-R6-#M" obtained by the prediction in S4, is made,so as to derive "#C-R3-R2" as a common part, whereupon the router R2 being the closest to the mobile terminal #M in the common part is determined as the cross over router. In the process shown in FIG. 7, when new path control information is received while waiting for the mobile terminal #M to migrate in S3, it is preferable that the process should return to S1, and the steps S1 and S2 should be carried out again.

According to the above-described embodiment, in a packet transfer network in which the transfer part and the control part are separated from each other, the control part (path control device 1) shares the path control information with the transfer part. And by carrying out the above-described process in FIG. 7 based on the path control information, when the mobile terminal #M connected to the network via radio migrates during communication, a suitable cross over router serving as a switchover point of the path can be determined.

As described above, according to the invention, in a packet transfer network, in which the transfer part and the control part are separated from each other, a cross over router serving as a switchover point of the path can be determined, on the occasion of a migration during communication of a mobile terminal connected to a network via radio.

What is claimed is:

1. A path control device connected to a plurality of transfer devices for transferring a packet on a network, the path control device comprising:
   a memory configured to store a plurality of pieces of path control information transferred from the plurality of transfer devices;
   a path controller configured to recognize a path between a mobile terminal and a correspondent terminal based on location information of each of the mobile terminal and the correspondent terminal and the plurality of pieces of path control information; and
   the path controller configured to predict a post-migration path extending from the correspondent terminal to a transfer device to which the mobile terminal will probably be connected after migration of the mobile terminal, and compare a pre-migration path extending from the correspondent terminal to a transfer device to which the mobile terminal has been kept connected before the migration and the predicted post-migration path to determine a transfer device serving as the switchover point.

2. The path control device according to claim 1, wherein the path controller is further configured to determine a transfer device closest to the mobile terminal in common between the pre-migration path and the post-migration path, as the transfer device serving as the switchover point.

3. A path control method applied to a path control device connected to a plurality of transfer devices for transferring a packet on a network so as to control a transfer path of the packet, the path control method comprising:
   receiving and storing a plurality of pieces of path control information transferred from the plurality of transfer devices;
   recognizing a pre-migration path between a mobile terminal and a correspondent terminal based on location information of each of the mobile terminal and the correspondent terminal as well as the plurality of pieces of path control information;
   predicting, when the mobile station migrates, a post-migration path between the mobile terminal after the migration and the correspondent terminal based on the location information of the mobile terminal after the migration, the location information of the correspondent terminal and the plurality of pieces of path control information; and determining a transfer device serving as a switchover point of the path based on the pre-migration path and the post-migration path.

4. The path control method according to claim 3, further comprising:

comparing the pre-migration path and the post-migration path to determine the transfer device serving as the switchover point.

5. The path control method according to claim 4, further comprising:

determining a transfer device closest to the mobile terminal in common between the pre-migration path and the post-migration path as the transfer device serving as the switchover point.

6. A path control device connected to a plurality of transfer devices for transferring a packet on a network, the path control device comprising:

an interface configured to receive a plurality of pieces of path control information transferred from the plurality of transfer devices;

a memory configured to store the plurality of pieces of path control information;

a path controller configured to recognize a pre-migration path between a mobile terminal and a correspondent terminal based on location information of the mobile terminal and the correspondent terminal and the plurality of pieces of path control information;

the path controller configured to predict a post-migration path between the mobile terminal and the correspondent terminal based on the location information of the mobile terminal after the migration, the location information of the correspondent terminal and the plurality of pieces of path control information; and the path controller configured to determine a transfer device serving as a switchover point of the path based on the pre-migration path and the post-migration path.

7. A path control device connected to a plurality of transfer devices for transferring a packet on a network, the path control device comprising:

means for receiving a plurality of pieces of path control information transferred from the plurality of transfer devices;

means for storing the plurality of pieces of path control information;

means for recognizing a pre-migration path between a mobile terminal and a correspondent terminal based on location information of the mobile terminal and the correspondent terminal and the plurality of pieces of path control information;

means for predicting a post-migration path between the mobile terminal and the correspondent terminal based on the location information of the mobile terminal after the migration, the location information of the correspondent terminal and the plurality of pieces of path control information; and means for determining a transfer device serving as a switchover point of the path based on the pre-migration path and the post-migration path.

* * * * *